Patented Feb. 22, 1949

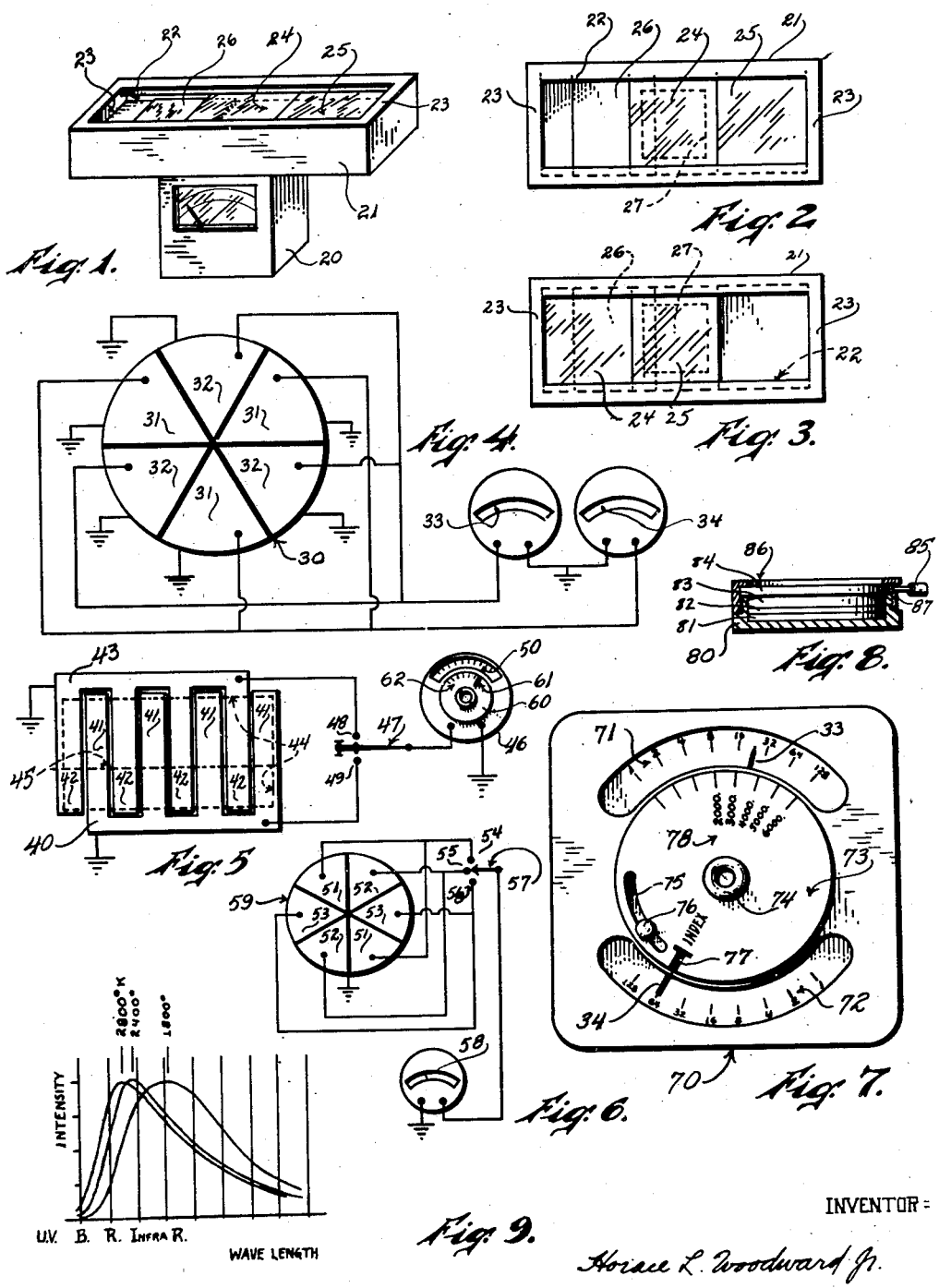

2,462,823

UNITED STATES PATENT OFFICE 2,462,823

PHOTOELECTRIC CELL COLOR TEMPERATURE MEASURING DEVICE

Horace Letellier Woodward, Jr., Arlington, Va., assignor to Weston Electrical Instrument Corporation, Newark, N. J., a corporation of New Jersey Application May 31, 1945, Serial No. 596,917

3 Claims. (Cl. 88—22.5)

The invention relates to the measurement of color quality and hue of light particularly, and is of value in the fields of color matching, color photography, colorimetric analysis, and wherever a critical hue must be reproducibly and identically perceptible.

Previous publication of subject matter leading to this invention may be found in American Photography, for September 1942; January 1943, and June 1944, p. 36.

It is an object of the invention to present convenient means for the measurement of color temperature, which shall be quickly adjusted, and give an objective measurement, rather than one dependent upon the operator's judgment of hue, as in a visual instrument.

A further object is to provide an instrument having maximum sensitivity for the range of color temperature being considered.

An advantage of the invention is that a substantially instantaneous reading may be obtained through use of a calculator dial coordinated with specially designed response characteristics of the indicating meter movements, without adjusting the intensity level of incident radiation to any fixed datum level.

Use of the invention will facilitate measurement of light intensity at desired regions of the spectrum, and permit their adjustment to specified ratios.

In colorimetric analysis the instrument may be used to indicate the endpoint color change of a reaction, or may be calibrated to indicate the percent of a constituent present as indicated by the shift of hue due to a color producing or discharging reaction.

The operation of the invention will be clearly understood and additional objects and advantages disclosed by consideration of the embodiments described in the subsequent specification and shown in the accompanying drawings, wherein Figure 1 is a perspective view of a light sensitive cell fitted with a filter registering head.

Figure 2 is a top plan thereof with one filter registered.

Figure 3 is a similar top plan with the other filter positioned.

Figure 4 is a schematic view of a composite light sensitive head and associated meters.

Figure 5 is a schematic view of a modified form thereof.

Figure 6 is a schematic plan and circuit diagram adapted to measurement of three "colors."

Figure 7 is an elevation of the face of coordinated meters and movable calculating disc, reading directly in color-temperature, over a range of intensity levels.

Figure 8 is a side elevation partly in section showing a light attenuating device using sheet polarizing elements, and adapted to a light sensitive head.

Figure 9 is a graph of spectral energy intensity with respect to wavelength for black body radiation at three color-temperatures, but with the curves adjusted to equal peak intensity for better relative comparison.

In the production of color photographs, it is important to specify a desired color quality, and to be able to adjust, measure, and to maintain it at constant value. For when simultaneous exposure of color records sensitive to respective spectral regions is made (such as when exposing a "mono-film tripac" color transparency, or print), the relative exposures thereof are effected by intensity in the several spectral regions, and will affect color balance and hue.

The term color quality as used herein has broader meaning than "color temperature" which is a more commonly heard term. "Color Temperature" refers to spectral energy distribution of radiation emitted from a "black-body." Having specified its color temperature and the intensity at one spectral region the intensity at any other region is fixed.

Color quality, however, recognizes empirically the three spectral regions, red, green and blue, which for balance with existing sensitivities of photographic emulsions may have to be specified individually and arbitrarily. In color printing, for instance, for best color balance in the result, it may be necessary to use corrective filters to distort the spectral intensity distribution of incandescent tungsten light from its approximately black-body characteristics, to fit some particular emulsion balance and processing conditions. Convenient means of measurement will be disclosed.

However, in some applications, the use of incandescent light at a specified color temperature is adequate. As a corollary to a previous statement, we may say that a specified ratio of intensity at two spectral regions fixes the color temperature of black-body radiation, and this invention presents a convenient means of so doing.

It is apparent that the greatest rate of change of intensity-ratio between two spectral regions with respect to color temperature is desirable, resulting in higher sensitivity and accuracy.

From consideration of Wien's displacement effects, and the characteristic curve of black body radiation intensity with respect to wavelength for several temperatures (illustrated in Figure 9), the optimum spectral regions may be discovered, and, theoretically should be selected for the range of color temperature investigated. For maximum sensitivity at a certain color temperature, intensity should be measured in a spectral region where the characteristic has maximum positive slope, and in that region where maximum negative slope is found. The ratio of these readings will be a most sensitive indication since a displacement of the curve to right or left as color temperature is lowered or raised will result in lessening the one reading and increasing the other. Intensity is measured in regions on opposite sides of the peak of the intensity vs. wavelength characteristic, as is shown in Figure 9. Then, as color temperature is progressively altered a change in intensity ratio will result in a continuous sense. If the peak wavelength then moves beyond either sensitivity region, a lessened sensitivity will result. While the condition for maximum sensitivity in determining a particular color temperature has been given, practically we wish to deal with a range of color temperatures—the region whose intensity is evaluated in the shorter wavelengths should be just below the maximum intensity wavelength or peak of the highest color temperature encountered, while the region in the longer wavelengths should lie just beyond the peak of the lower color temperature expected. Similar reasoning will govern in selection of sensitivity for disclosing hue changes in colorimetric applications.

For practical use it is found that satisfactory results are obtained in the measurement of incandescent tungsten light from 2000°–3300° by use of a red filter, Wratten 29F, and a blue filter, Wratten 47–C5, in conjunction with a photovoltaic cell.

To obtain a measure which varies in direct sense with color temperature, the reading of blue intensity may be expressed as a fraction, or percent, of the reading of red intensity, this measurement being low at low color temperatures and higher as the color temperature increases. Ordinarily, however, the scale will be calibrated directly in color temperature.

Figure 1 discloses an embodiment of the invention which may be attached to existing photoelectric measuring devices 20, as illustrated, or may be emplaced over the light-sensitive cell of an instrument having a fixed measuring instrument associated therewith. A housing 21, engaged upon the cell case of the device 20, includes side grooves 22, and end stops 23, confining filter elements 24 and 25 therein. The length of the side grooves 22 is made three times the length of each filter, so that each filter will be successively registered over the central photo cell area 27, dotted in Figures 2 and 3, when the filters are at opposite limits of movement. A light attenuating mask 26 is provided, being movable over the cell area to limit the response to a predetermined index value. Or the device of Figure 8, utilizing the "polar-screen" may be employed; insertion of resistance or shunts in suitable electrical circuits may in some cases be practical to "zero the reading." The filter 24 limits the response to a region of the spectrum in the longer wavelengths, conceivably into the infra-red, but practically speaking, it is a red filter. The filter 25 limits response to a spectral region in the short wavelengths, perhaps into the ultra violet, and will be termed a blue filter.

*Operation of the device*

Operation of the device of Figure 1 is as follows: The red filter 24 is placed over photo cell by sliding to the extreme shown in Figure 2, and the light in question directed thereon. The mask 26 is adjusted so that the indicating device reads, say, 100, and is secured. This may be termed "zeroing." The filters are moved to the opposite extreme as in Figure 3, registering the blue filter 25, and the reading of the meter is noted. This reading is an indication of color temperature. It may be used in conjunction with a calibration plot or the meter may be directly scaled in color temperature. The reading may be used arbitrarily as an indication that a pre-selected color quality is matched.

Figure 4 presents a form which may be used without any flicking of filters, or of switches. A composite light sensitive element 30 is made up of alternate sectors of red sensitivity 31, and of blue sensitivity 32. Cells of like sensitivity are connected in parallel and their respective responses are indicated on the meters 33 and 34. This pattern of interspersed filter-photocells is such that response will be influenced only by color quality of the light, and will minimize the effect of position of the device, should it be used in a beam not constant in intensity over its section. The two indicators, which may be combined into one dial as a two movement meter, are read simultaneously, and the indication used in the same manner as the readings obtained with the device of Figure 1. Or the meters may be arranged in the form shown in Figure 7, to be described. A light attenuator to be used in "zeroing" this type of sector photocell head is shown in Figure 8, to be described.

Figure 5 presents a pattern of photocell elements having certain advantages, and illustrates a circuit with switch permitting use of a single meter. A photo-sensitive element 40, having sensitivity to the one spectral region such as red, has extended fingers 41, intermeshed with similar shaped fingers 42 of the so-called blue sensitive element 43. The working area of this combination is limited to the dotted outline 44, such that similar areas of each filter are exposed. Actual area of respective filters may, however, be adjusted as required for compatible and convenient readings in the range of color temperature measured. Use of this format permits simple adjustment of "zero" or indexing reading, by use of a sliding mask 45 which moves longitudinally of the strip elements 41—42, its movement having equal effect on each set, and therefore not affecting the ratio of their response.

Output from the respective cells is fed to the meter 46 through the selector switch 47. Contact thereof with terminal 48 permits blue intensity to be read, while contact with terminal 49 causes the meter to indicate red intensity.

The meter 46 shown in Figure 5 has a movement and/or circuit such that its response is logarithmic, a well known expedient in the field of electrical measurements. Cooperating with this indicator is a rotatable disc 60 pivoted about the extended axis of the meter movement. The disc 60 bears a radial index mark 61 to be aligned with the indicating pointer 50 of the meter 46 when switch 47 contacts the terminal 49 and red intensity is being indicated. Disc 60 is calibrated in terms of color temperature 62 so that when the switch 47 is moved to contact 48 and blue intensity is indicated on the meter's logarithmic scale, the indicating pointer will be aligned with the actual color temperature calibrated upon disc 60, and this may be read directly. The precise construction and calibration may be seen in Figure 7, to be described, with the exception of the position of the index 61. For use with a single fixed scale, this must evidently lie within the region thereof, and will be coincident with that color temperature for which indicated intensities on the meter 46 are equal for both regions of the spectrum, red and blue, for example.

Figure 6 depicts means for completely specifying critical intensities, in the red, the green and the blue wave-lengths. A composite photo-cell head 59 is composed of sectors 51 sensitive to red, 52 sensitive to green, and 53 sensitive to blue radiation incident thereon. Sections of like sensitivity are connected in parallel and fed to respective taps, contacts, 54, 55, 56 of a selector switch 57 whereby the intensity of each color, or spectral region, may be read successively upon the meter 58. The respective cells are included within the small circular area and so arranged that should the device 59 be held slightly off center in a beam of light of non-uniform intensity, or small in area, the error will be somewhat minimized, for should one sector receive less intensity, the opposite sector, being of like sensitivity and receiving the greater intensity, will compensate the inequality.

This device constitutes a trichromatic color meter particularly adapted to usage in color photography, and serves to adequately measure and permit specification of color quality. By the use of the Wratten "CC" filters or other compensating filters, blue-green, magenta and yellow in color respectively, the intensity of red, green, and blue as indicated on the meter may be each separately adjusted to match a selected ratio.

Its adaptation to densitometric colorimetry is obvious—measuring the density of a pigment or dye to each of the primary colors is an adequate specification of its hue. In this measurement the tricolor head 59 would receive the light transmitted or reflected from a defined area of the sample, and the density determined by well known methods.

Having determined the intensity of radiation at two spectral regions by any of the foregoing methods and instruments, their ratio may be obtained by use of a slide rule, for example, and used in conjunction with a calibration plot to find color temperature, or the slide rule may be so calibrated directly. This may be made in circular form and mounted on the meter for convenience. In Figure 5 was shown a form particularly designed to cooperate with a particularly designed character of meter response.

Figure 7 illustrates an arrangement of two meters, such as those shown in Figure 4, which indicate continuously the respective values, so that by adjustment of a coordinating dial the color temperature is directly indicated over a considerable range of incident intensities. A case 70 houses two meter movements and respective pointers, 33 responsive to one color, blue, and 34 indicating intensity of red, for example. Each of these has a logarithmic response characteristic over a considerable range of intensity, as is indicated by the scales of light intensity, 71 and 72. This logarithmic characteristic, whereby a geometrical progression of light intensities is indicated at an arithmetic series of distance intervals on the scale, is readily attained, except in the low deflection portion, through use of series resistance in some circuits, use of special portions of thermionic characteristics in others, or by use of shaped pole pieces in the final meter.

The intensity scales 71 and 72 increase from zero in the same sense, clockwise as illustrated, and should be approximately concentric. For convenience in manufacture, however, their centers may be displaced slightly without causing inaccuracy, so that meter movements need not be coaxial. Upon the face of the case 70 is a disc 73 pivoted at 74 medially of the line joining axes of the meter movements. Rotation of the disc 73 is limited by the arcuate slot 75 and included pin 76, so that the index 77 may not be moved beyond the logarithmic response portion of scale 72, nor may color temperatures be directly read except in the logarithmic response portion of scale 71. An index mark 77 is placed on the disc 73 and will be aligned with indicator 34. A scale of color temperature 78 is calibrated upon the disc 73 and is read in conjunction with the indicator 33. In use, the composite light sensitive head is placed in the beam of light to be tested, and intensity adjusted merely so that a reading in the logarithmic response portion of both scales 71 and 72 is obtained. The index 77 is now set to the pointer 34 by rotating the disc 73, and color temperature may be read directly on scale 78 as indicated by the pointer 33.

It may be noted that scales 71 and 72 may be omitted entirely, except for measurement at intensity levels not legible in the logarithmic response portion. A device of similar appearance but omitting the stop 76 and indicating pointers 33 and 34 may be used as a calculator, or modified for this use as suggested in discussion of Figure 5.

A convenient means of adjusting incident intensity uniformly over the area of the cell is shown in Figure 8. A housing 80 encloses a photo-sensitive element 81, which may be the composite sector head previously shown, and associated filter layer 82, over which lies a sheet of polarizing material such as "Polaroid" 83 fixed against rotation in its plane with respect to the housing 80. Thereabove a rotatable sheet polarizing element 84, having a handle 85, is retained by the flanged ring 86. The angle between the planes of polarization of the respective sheets 83 and 84 may be varied by the handle 85 which is free to move in the slot 87, altering the transmission so that a suitable intensity is incident upon the filters 82.

While certain embodiments of the invention have been set forth as examples, various other constructions and arrangements are possible and will fall within the scope of the appended claims.

I claim:

1. A direct reading color temperature meter comprising a first photocell having a red filter fixed over the light active surface; a second photocell having a blue filter fixed over the light active surface said second photocell being disposed immediately adjacent to the first photocell; an instrument having a movable coil carrying a pointer; a switch selectively operable to connect one or the other of said photocells individually to said movable coil; a rotatable disc pivoted about the extended axis of the movable coil said disc having a diameter less than the length of the said pointer; a set of radial graduations carried by the disc said graduations being marked in color temperature values; and an index mark carried by said disc said index mark settable in alinement with the pointer when the first photocell is connected to the movable coil, whereby the pointer will cooperate with the radial graduations on the disc when the second photocell is connected to the movable coil thereby providing a direct reading of the color temperature of the light source to which the photocells are exposed.

2. The invention as recited in claim 1, wherein the first photocell comprises a plurality of transversely extending fingers intermeshed with similar fingers of the second photocell.

3. The invention as recited in claim 1 and including a masking member adjustable to overlie desired portions of the photocell surfaces.

HORACE LETELLIER WOODWARD, Jr.

REFERENCES CITED

The following references are of record in the file of this patent:

UNITED STATES PATENTS

| Number | Name | Date |
|---|---|---|
| 1,728,073 | Neale | Sept. 10, 1929 |
| 2,015,675 | Hays | Oct. 1, 1935 |
| 2,164,513 | Gaebel | July 4, 1939 |
| 2,203,036 | Van Briessen et al | June 4, 1940 |
| 2,237,713 | Russell | Apr. 8, 1941 |
| 2,298,667 | Weymouth | Oct. 13, 1942 |
| 2,353,475 | Kinnard | July 11, 1944 |

FOREIGN PATENTS

| Number | Country | Date |
|---|---|---|
| 113,865 | Great Britain | Mar. 14, 1918 |
| 446,016 | Great Britain | Apr. 22, 1936 |